United States Patent [19]

Taguchi

[11] 3,745,902

[45] July 17, 1973

[54] SELF-TIMER CIRCUIT AND SELF TIMER-DEVICE INCORPORATING SAID SELF TIMER CIRCUIT

[75] Inventor: Tetsuya Taguchi, Kawasaki, Japan

[73] Assignee: Canon Kabushiki Kaisha, Tokyo, Japan

[22] Filed: July 31, 1972

[21] Appl. No.: 276,292

[30] Foreign Application Priority Data

Aug. 9, 1971 Japan .............................. 46/60130

[52] U.S. Cl. ............................... 95/53.3, 95/10 CE

[51] Int. Cl. ............................................ G03b 9/64

[58] Field of Search ..................... 95/10 CE, 10 CT, 95/53 EA, 53 EB, 53.3

[56] References Cited

UNITED STATES PATENTS 3,608,461 9/1971 Espig .................................. 95/53.3

3,672,267 6/1972 Harvey et al. .......................... 95/10

*Primary Examiner*—Samuel S. Matthews
*Assistant Examiner*—Michael L. Gellner
*Attorney*—William R. Woodward

[57] ABSTRACT

This invention provides a self-timer circuit for a camera including an electronic circuit. The electronic circuit is capable of generating a signal at a predetermined time before the actuation of the timer is completed. To this end, the self-timer device includes a time-constant circuit having resistor and capacitor, a first switching circuit operable between two states in response to a voltage across the capacitor and the output terminal of this switching circuit is coupled to an electromagnet for releasing the shutter, and a display circuit for giving said signal.

5 Claims, 11 Drawing Figures

SELF-TIMER CIRCUIT AND SELF TIMER-DEVICE INCORPORATING SAID SELF TIMER CIRCUIT

BACKGROUND OF THE INVENTION

1. Field of the Invention

The present invention relates to a self-timer circuit for use in self-timer photography (by camera) and more particularly a self-timer circuit and a self-timer device incorporating said self-timer circuit including a display circuit capable of giving the signal noticing a time at which the self-timer device is actuated.

2. Description of the Prior Art

In the conventional self-timer photography, the mechanical self-timer device has been generally used, but there has been recently devised and demonstrated a shutter circuit including an electronic timer circuit.

In both mechanical and electronic self-timer devices, the shutter of a camera is released at a predetermined time after the self-timer devices are started. The actuating or shutter release time, which is generally indicated for example by a self-timer level or the like, is not clearly indicated. That is, whether the shutter is released or not is detected only by the shutter release sound or by the position of the self-timer set lever, and it is impossible to see previously when the shutter is to be released. This is very inconvenient because an object to be photographed must be kept still during all the time the self-timer is actuated.

SUMMARY OF THE INVENTION

The present invention was made to overcome the above and other defects or problems encountered in the prior art self-timer devices.

Briefly stated, according to the present invention an electric circuit is used in the timer circuit and the like warning signal is generated by a flash lamp or the like at a predetermined time before the pre-set timer is actuated. In other words, the shutter is released at a predetermined time after the warning signal is generated so that the self-timer photography may be much facilitated.

It is therefore the primary object of the present invention to provide an electronic self-timer circuit including a circuit capable of giving the warning signal at a predetermined time before the completion of the actuation of the timer independently of the self-timer actuating time.

DESCRIPTION OF THE PREFERRED EMBODIMENTS

The present invention will become more apparent from the following description of some preferred embodiments thereof taken in conjunction with the accompanying drawing.

Figure 1:
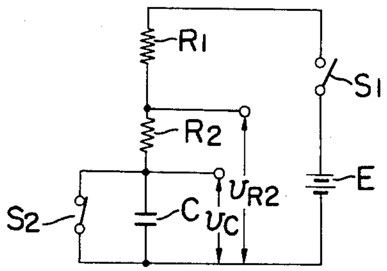
FIG. 1 is a circuit deagram used for explanation of the underlying principle of the present invention.
Figure 2:
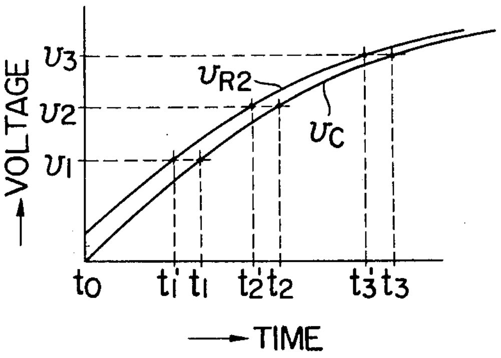
FIG. 2 is a graph illustrating the characteristics of the circuit shown in FIG. 1.

In a CR time constant circuit used in a self-timer circuit in accordance with the present invention shown in FIG. 1, $R_1$ and $R_2$ denote resistors; C, a capacitor; $S_1$ and $S_2$, switches and E, a power soure. The voltage across the capacitor C is designated by Vc and the voltage across the resistor $R_2$ and capacitor C or between the junction between the resistor $R_1$ and $R_2$ and the negative terminal of the power source, by $V_{R2}$. When the switch $S_1$ is closed whereas the switch $S_2$ is opened, the capacitor C is charged through the resistors $R_1$ and $R_2$. The relations between the voltages $Vc$ and $V_{R2}$ and time are shown in FIg. 2. The time is plotted along the abscissa whereas the voltages Vc and $V_{R2}$, along the ordinate. The curve 1 denotes the voltage Vc whereas the curve 2, the voltage $V_{R2}$. At $t_0$ when the switch $S_1$ is closed, the voltage $Vc$ is zero whereas the voltage $V_{R2}$ is $Vo$ slightly higher than the voltage $Vc$. The voltages $V_{R2}$ and $Vc$ are given by $$V_{R2}=E\left(1-\frac{R_1}{R_1+R_2}\epsilon-\frac{t}{C(R_1+R_1)}\right) \quad (1)$$

$$Vc=E\left(1-\epsilon-\frac{t}{C(R_1+R_2)}\right) \quad (2)$$

The time $t_1$ and $t_1'$ elapsed until the voltages $V_{R2}$ and Vc reach a predetermined voltage $V_1$ are given from Eqs. (1) and (2)

$$t_1=C(R_1+R_2)\log e\frac{\frac{R_1}{R_1+R_2}E}{E-V_1} \quad (3)$$

$$T_1'=C(R_1+R_2)\ \mathrm{loge}\ (E/E-V_1) \quad 4$$

From Eqs. (3) and (4), the difference between $t_1$ and $t_1'$ is $$t_d=t_1-t_1'=C(R_1+R_2)\ \mathrm{loge}\ (R_1/R_1+R_2) \quad 5$$

From Eq. (5), it is seen that the difference in time between $t_1$ and $t_1'$ is a function of $C_1$, $R_1$ and $R_2$ and is independent of the predetermined voltage $V_1$.

The time difference $t_d$ is always constant independently of the voltage $V_1$ so that even when the setting time (that is the voltage $V_1$) of the self-timer is changed, it may be possible to give the warning signal at $t_1$, which is earlier than $t_1$, by $t_d$, which is the setting time. This is shown in FIG. 2, and it is seen that even when the setting time is varied as shown by $V_1$, $V_2$, and $V_3$, the time difference $t_d$ is always constant. The self-timer circuit in accordance with the present invention is based upon the principle described above.

Next referring to FIG. 3, the first embodiment of the self-timer circuit in accordance with the present invention will be described. Reference numeral 1 denotes a potentiometer type variable resistor; 2, a capacitor which constitutes a time-constant circuit together with the variable resistor 1; 3, a switch shunting across the capacitor 2 for actuating the self-timer; 4 and 5, transistors which constitute a first differential amplifier circuit; 6, and 7 resistors; 8, and 9, transistors which also consitute a second differential amplifier; 10 and 11, resistors inserted in the second differential amplifiers, respectively; 12, a voltage division circuit or potentiometer for setting the self-timer actuating time; 13, a transistor in a warning signal display circuit; 14, a warning lamp; 15, an output transistor for the self-timer; 16, an electromagnet for controlling a shutter release mechanism or the like; 18, an ON-OFF switch; and 19, a power source.

Next the mode of operation will be described. First the switch 18 is closed whereas the short-circuiting switch 3 is opened. Then the lamp 17 is turned on, giving the signal that the self-timer circuit is now energized. In this case, both the transistors 13 and 15 are cut off so that no current flows through the lamp 14 and the electromagnet 16, but the voltage division point C of the potentiometer 12 is so selected that the transistors 5 and 9 are conducted. When the switch 18 is closed, the capacitor C in the time-constant circuit is charged through the resistor 1. When the voltage $V_A$ at the point A becomes higher than the volatge Vc at the point C, the transistor 4 in the first differential amplifier is conducted whereas the transistor 5 is cut off so that the voltage across the resistor 6 drops, thus resulting in the conduction of the transistor 13. As a result, the warning lamp 14 is turned on. As the capacitor C is further charged so that the voltage $V_B$ at the point B becomes higher than the voltage Vc at the point C after a predetermined time elapse, the transistor 8 in the second differential amplifier is conducted whereas the transistor 9 is cut off. As a result, the output transistor 15 is conducted so that the electromagnet 16, which may be a conventional electromagnetic plunger, is energized. Then, the shutter release mechanism (not shown) is actuated so that the self-timer photography is started.

In the instant embodiment, the actuating time of the self-timer may be set to a desired time by suitably selecting the voltage Vc by the potentiometer 12, and the time elapsed from the time the self-timer is started till the time the warning lamp is turned on may be made constant by the potentiometer independently of the self-timer actuating time. That is, the self-timer is actuated at a predetermined time after the warning lamp 14 is turned on to release the shutter so that the photography by the self-timer may be smoothly carried out.

Next referring to FIG. 2, the second embodiment of the present invention will be described The second embodiment is made simple is design compared with the first embodiment because the two differential amplifiers use common transistors. The same circuit components as those of the first embodiment shown in FIG. 3 are designated by the same reference numerals. The mode of operation is substantially similar to that of the first embodiment, and the same function may be accomplished.

Next referring to FIG. 5, the third embodiment of the present invention will be described. The display circuit is the most important feature of the third embodiment whose self-timer circuit is substantially similar to that of the second embodiment shown in FIG. 4. In FIG. 5 same reference numerals are also used to designate same circuit components. Reference numeral 20 denotes a switching transistor; 21, a multivibrator circuit; 22, a transistor in the displaycircuit; and 23, a lamp for displaying that the self-timer is being actuated or in operation.

Next the mode of operation will be described. When the switch 18 is closed whereas the switch 3 is opened, the transistor 20 in the display circuit is conducted, and the multivibrator 21 oscillates at a predetermined frequency so that the transistor 22 is conducted and cut off at the same frequency. Thus, the display lamp 23 is flashed at the same frequency. The flashing frequency may be so selected that the display lamp 23 may flash every one second. When the transistor 15 in the self-timer circuit is conducted, the transistor 20 is cut off so that the multivibrator 21 is de-energized. As a result, the display lamp 28 is turned off. The rest of the mode of operation is substantially similar to that of the first and second embodiments shown in FIGS. 3 and 4.

In summary, in the third embodiment, the display lamp 23 flashes when the self-timer is actuated, and the warning lamp 14 is turned on at a predetermined time before the timer is actuated. The lamp 23 is turned off when the shutter is released. Thus, the operation of the self-timer may be more clearly displayed.

So far in the first, second and third embodiments the lamps are used to give the warning, but it is seen that instead of the lamps, which are the visual display, audio display or warning devices suc as buzzers may be used.

Figure 3:
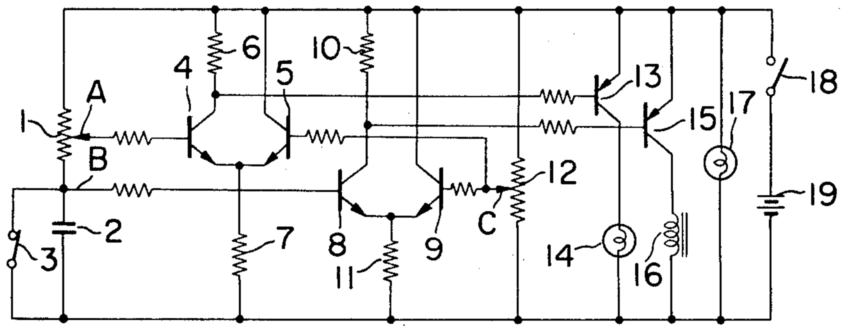
FIGS. 3, 4 and 5 are circuit deagrams of a first, second and third embodiments of the present invention, respectively.
Figure 4:
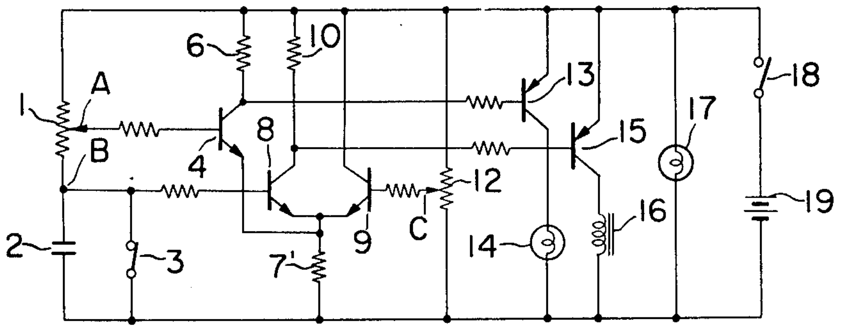
Figure 5:
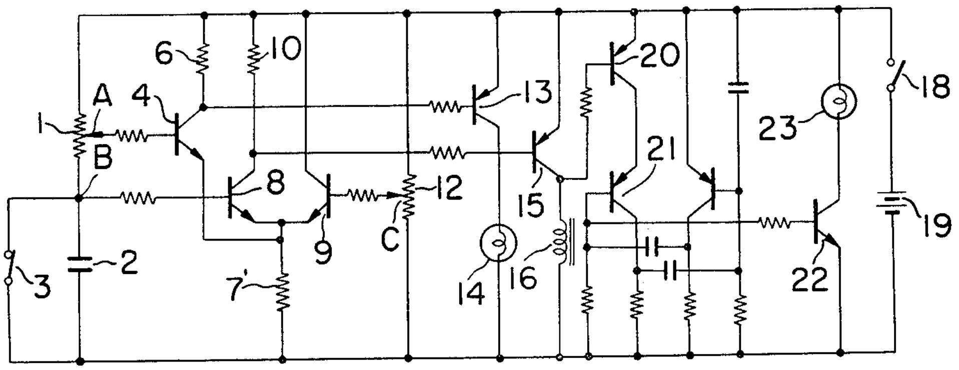
Figure 6:
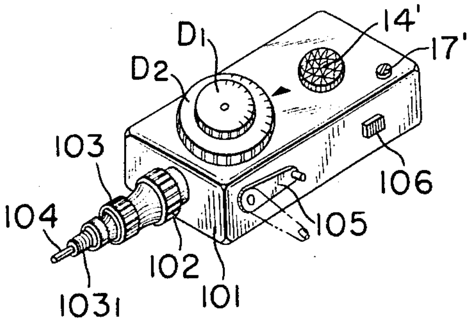
FIG. 6 and 7 are respective views of self-timer attachments incorporating one of the three circuits shown in FIGS. 3, 4 and 5.
Figure 7:
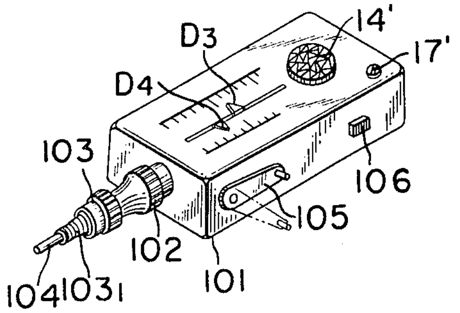

FIGS. 6 and 7 show the self-timer attachments incorporating the self-timer circuits shown in FIGS. 3–5. In FIG. 6, reference numeral 101 denotes a casing; 102, a projected attachment seat extending from one side wall of the casing 101; 103, a coupling rotatably fitted over the projected attachment seal 102; $103_1$, screws formed at the leading portion of the coupling 103 and screwed into a threaded hole which is generally provided in a shutter release button so that the self-timer attachment may be mounted on a camera; 104. a cable release extending from the casing 101 in such a manner that when the electromagnet 16 is energized, the plunger is displaced so that the cable release connected to the plunger may be further extended; $D_1$, a setting dial which is coupled to the slider of the variable resistor 1 for setting the time when the warning lamp is turned on; $D_2$a setting dial which is operatively coupled to the sliding arm of the variable resistor 12 for setting the time when the self-timer is actuated; 14' and 17', windows of the display lamps 14 and 17, respectively; and 105 and 106, a lever and a button for actuating the switches 18 and 3, respectively.

The self-timer attachment shown in FIG. 7 is substantially similar to that shown in FIG. 6 except that instead of the setting dials $D_1$ and $D_2$, sliders $D_3$ and $D_4$ are provided for controlling the variable resistors 1 and 12 whose resistances may be linearly varied.

Next the mode of operation will be described. The self-timer attachment is mounted on the camera by screwing the screw $103_1$ into the threaded hole in the shutter release button of the camera, and, the self-timer time such as 15 or 20 seconds is set by the dials $D_2$ and $D_4$, and the warning time is set by the dials $D_1$ and $D_3$ in order to setting the time when the warning lamp 14 is turned on at a predetermined time, for example 5 seconds, before the shutter is released. The lever 105 is moved to the position indicated by the broken lines, thereby closing the switch 18, and then the button 106 is depressed to open the switch 3. Since the button 106 is a double-action type push-button so that when it is depressed, it remains in depressed position so that the switch 3 may be kept opened. In the manner described above, the lamp 17 is turned on so that one may see from a position away from the camera that the self-timer is in operation. A predetermined time, for example 5 seconds, set by the dials $D_1$ and $D_3$ before the electromagnet 16 is energized to thereby release the shutter, the lamp 14 is turned on and one may see the turned-on lamp 14 through the window 14'. Therefore one may previously see when the shutter is released. Next the electromagnet 16 is energized, and the shutter is released as the cable release 104 is further extended in the manner described above.

Figure 8:
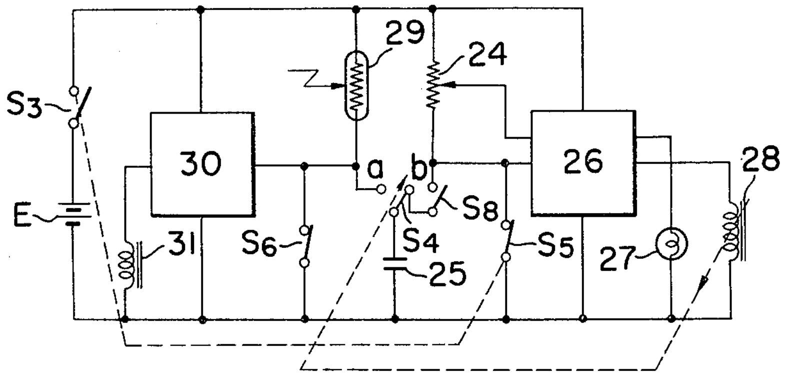
FIG. 8 is a circuit diagram of a fourth embodiment of the present invention.

Next referring to FIG. 8, the fourth embodiment will be described in which the self-time circuit in accordance with the present invention is incorporated in an electronic shutter camera. In FIG. 8, reference numeral 24 denotes a potentiometer in the self-timer circuit; 25, a capacitor which may be used in common both in the shutter time control circuit and the self-timer circuit; 26, a timer control circuit; 27 a warning lamp; and 28, an electromagnet for starting the shutter. The above components 24 – 29 are similar to those in the embodiment described hereinbefore. Reference numeral 29 denotes a photoelectric cell for controlling the shutter speed; 30, a shutter speed control circuit; 31, an electromagnet for closing the shutter; $S_3$–$S_8$ are switches which are interlocked as shown in FIG. 8; and E, a power source, which is used in common both by the shutter control circuit and the self-timer circuit. The switch $S_4$ is operatively coupled to the electromagnet 28 in such a manner that the movable contact which normally closes the stationary contact *b* is switched to close the stationary contact *a* when the electromagnet 28 is energized. The switches $S_3$ and $S_5$ are so operatively coupled to each other that when the shutter blades are opened the switch $S_3$ is closed whereas the switch $S_5$ is opened.

Next the mode of operation will be described. First when the self-timer is not used, the switch $S_8$ is opened. The electronic shutter circuit is of the conventional type in which the power switch $S_3$ is closed when the shutter release button is depressed, and when the shutter button is further depressed to release the shutter, the capacitor 25 is charged through the photoelectric element 29 and the electromagnet 31 is energized through the shutter speed control circuit 30 so that the optimum exposure may be obtained.

When the self-timer is used, the switch $S_8$ is closed. When the shutter release button is depressed, the power switch $S_3$ is closed whereas the switch $S_5$ is opened, and the shutter release button is held in this position. The capacitor 25 is charged through the potentiometer 24 and the closed stationary contact *b* of the switch $S_4$. The self-timer control circuit 26 is actuated in the manner described hereinbefore so that the warning lamp 27 is turned on. After a predetermined time the electromagnet 28 is energized so that the movable contact of the switch $S_4$ is switched from the stationary contact *b* to *a*. Thereafter the shutter release is so actuated that the switch $S_6$ is closed. As a result, the capacitor 25 is charged by the current flowing through the photoelectric cell 29 and the stationary contact *a* of the switch $S_4$. When the self-timer is actuated, the charge accumulated on the capacitor 25 is discharged because the switch $S_6$ is closed when the switch $S_4$ is switched to the stationary contact *a*.

Figure 9:
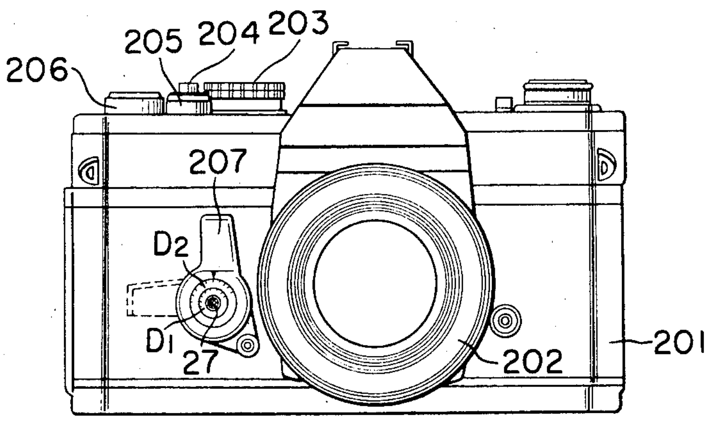
FIGS. 9 and 10 are views illustrating a single-lens reflex camera incorporating the circuit shown in FIG. 8.
Figures 10, 11:
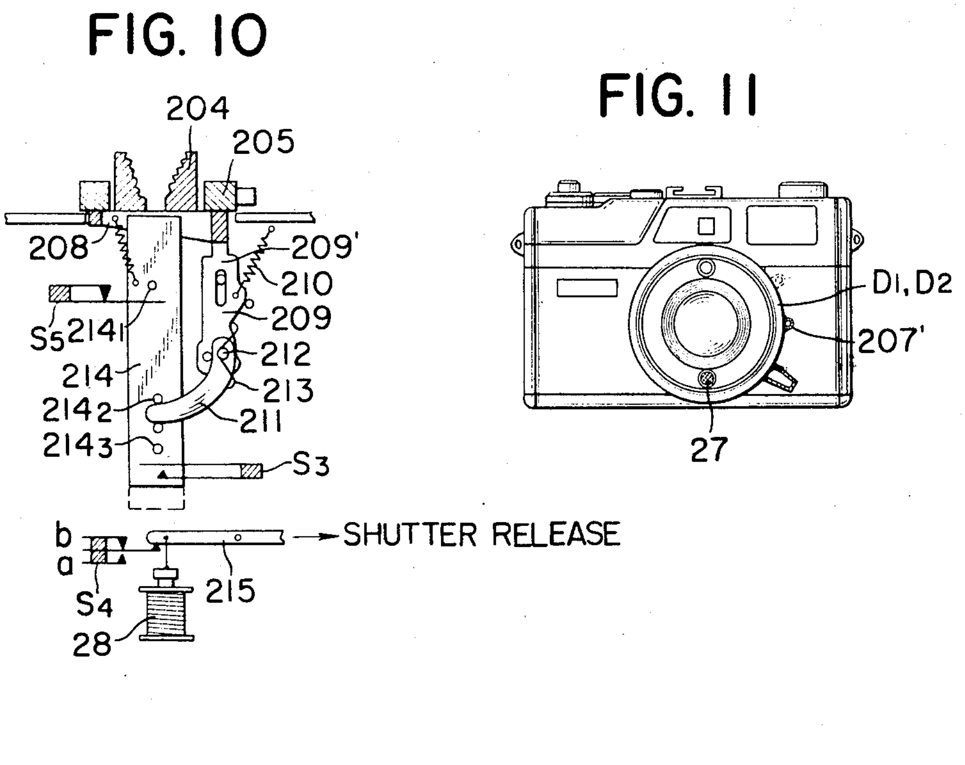
FIG. 11 is a view illustrating a camera with a range-finder incorporating also the circuit shown in FIG. 8.

FIGS. 9 and 10 show the single-lens reflex cameras incorporating the circuit shown in FIG. 8. Reference numeral 201 denotes a camera body; 202, an interchangeable lens; 203, a shutter setting dial; 204, a shutter release button; 205, a holder; 206, a film advance lever; and 207, a self-timer lever which is operatively coupled to the switch $S_8$. When the lever 207 is in the position indicated by the solid lines the switch $S_8$ is opened, but when the lever 207 is shifted to the position indicated by the broken lines, the switch $S_8$ is closed. The warning lamp 27 is disposed coaxially of the self-timer lever 207. The dials $D_1$ and $D_2$ (See FIG. 6) are also disposed coaxially of the self-timer lever 207. As best shown in FIG. 10, a cam surface is formed on the undersurface of the holder 205, and a cam follower 209 has its leading end 209' made into contact with the cam surface 208 under the force of a spring 210. In FIG. 10, the holder 205 is shown as being set for using the self-timer. A hold lever 211 is rotatably pivoted with a pin 212 to the cam follower 210 and is biased by a spring 213 so as to normally rotate in the clockwise direction. Pins $214_1$, $214_2$ and $214_3$ extending from a shutter release member 214 are engaged with the switch $S_5$, the hold lever 211 and the switch $S_3$, respectively. A shutter release lever 215 is actuated by the magnet 28.

Nex t the mode of operation will be described. First when the self-timer is not used, the lever 207 is held in the position indicated by the solid lines so that the switch $S_8$ remains opened. As a result the magnet 28 is not energized. When the self-timer is used, the lever 207 is shifted to the position indicated by the broken lines to close the switch $S_7$, and the holder 205 is rotated to the position shown in FIG. 10 so that the hold lever 211 is advanced into the path of the pin $214_2$. When the shutter release button is depressed under these conditions, the switch $S_3$ is closed whereas the switch $S_5$ is opened. The pin $214_2$ moves past the end of the hold lever 211 and the release member 214 is held in position by the end of the hold lever 211. The reason why the release member 214 is held in this position is to prevent the shutter release button from being depressed further so as to actuate the shutter release lever 215. After a predetermined time elapse, the lamp 27 is turned on and then the magnet 28 is energized so that the shutter is released. As the magnet 28 is energized, the switch $S_4$ is switched from the stationary contact *b* to *a*. In this case, the movable contact of the switch $S_4$ is switched from the stationary contact *b* to *a* before the shutter release lever 215 releases the shutter so that the charge accumulated on the capacitor 25 is discharged through the shunt switch $S_6$ before the shutter blades are opened. Thereafter, the shutter is opened by the shutter release lever 215, and in response to the opening of shutter blades, the switch $S_6$ is opened, and the shutter control operation is then started.

FIG. 11 illustrates one embodiment of the present invention in which the circuit described with reference to FIG. 8 is incorporated in a camera with a rangefinder. The warning lamp 27 is disposed in the front of the lens barrel, and the dials $D_1$ and $D_2$ (See FIG. 6) are disposed coaxially of the lens barrel. A self-timer button 207', which corresponds to the self-timer lever 207 in FIG. 9, is disposed on the camera body.

As described hereinbefore, in the self-timer circuit in accordance with the present invention, the warning signal is generated a predetermined time before the shutter is released by the self-timer so that the self-timer photography may be much facilitated and may be smoothly carried out.

I claim:

1. A self-timer device for releasing a shutter of a camera comprising a time-constant circuit comprising resistor means having a voltage division point and capacitor, a first switching circuit for switching between two states in response to a voltage across said capacitor, the output terminal of said first switching circuit being coupled to an electromagnet means for releasing the shutter of the camera, and a display circuit means whose input terminal is connected to the voltage division point of said resistor means, said display circuit means comprising a second switching circuit whose input terminal is connected to said voltage division point of said resistor means, and display means connected to the output terminal of said second switching circuit, whereby said display means may give the warning signal before said electromagnet means is energized to release the shutter.

2. A self-timer device as set forth in claim 1 wherein said resistor means comprises a variable resistor and a divided voltage is derived from its sliding arm.

3. A self-timer device as set forth in claim 1 wherein said display circuit further comprises an oscillator whose operation is controlled by the output of said second switching circuit so that display means flashes.

4. A self-timer device as set forth in claim 1 wherein said switching circuit comprises a differential amplifier one of the input terminals of which is coupled to said capacitor and the other terminal of which is coupled to said resistor means, whereby the self-timer time may be set to a desired time in response to the resistance of said resistor means having a voltage division point.

5. A camera incorporating a self-timer device for releasing a shutter of said camera comprising resistor means and a photoelectric cell for measuring the brightness of a subject, switching means for selecting either of said resistor means or said photoelectric cell, a capacitor coupled to said switching means for setting a time, a first switching circuit whose input terminal is connected to said resistor means and whose output terminal is connected to electromagnet means for releasing the shutter of said camera, a second switching circuit means whose input terminal is connected to said photoelectric cell and whose output terminal is connected to control means which controls the closure of said shutter, and a display circuit means whose input terminal is connected to the voltage division point of said resistor means and which comprises a third switching circuit whose input is connected to the voltage division point of said resistor means, and display means connected to the output terminal of said third switching circuit.

* * * * *